Aug. 3, 1937.  A. FEKETE  2,088,949
ELECTRIC CONDUCTOR
Filed Feb. 3, 1932

INVENTOR
ALEXANDER FEKETE
BY
ATTORNEY

Patented Aug. 3, 1937

2,088,949

UNITED STATES PATENT OFFICE 2,088,949

ELECTRIC CONDUCTOR

Alexander Fekete, Berlin, Germany, assignor to Radio Patents Corporation, New York, N. Y., a corporation of New York Application February 3, 1932, Serial No. 590,576
In Germany February 10, 1931

6 Claims. (Cl. 173—264)

This invention relates to insulated electric conductors, and method for making same, and more particularly to a condenser type insulator or bushing for high voltage comprising substantially a metal base such as aluminum provided with an oxide coating or coating of similar chemical compound serving as the dielectric for the condenser.

In the prior art, condensers are usually made having electrodes of wide surface areas such as sheets of tin foil and the like and employing as a dielectric material a thin wax paper separating the electrode surfaces. In another form, a liquid electrolyte has been used to form a film of unilateral conductivity upon the electrode surfaces by electro-chemical action as a potential is applied to its electrodes. Both types of condensers, as is well known, possess inherent disadvantages and drawbacks, the former especially of becoming rather bulky when a high capacity is required and the latter being inferior mechanically as well as electrically due to the use of a liquid electrolyte.

One of the objects of this invention is to provide a permanent low cost condenser of high electrostatic capacity which is devoid of the aforementioned drawbacks inherent in the conventional types of condensers heretofore used in the art. In general, as will be understood, the invention purports to provide a method of making electrically insulated devices with improved insulating quality which can be easily manufactured at low cost and for high voltages.

It is well known to oxidize the conducting layers of an electric condenser such as aluminum foil and to use the oxide film as a dielectric of the condenser. This method of making an electric condenser, however, has not as yet been used successfully owing to various disadvantages due primarily to the presence of minute air spaces or voids between the aluminum sheets which, as is well known to those acquainted with the art, will make it impossible to operate the condenser on high voltages over a substantial period of time due to the production of a glow or corona discharge resulting in an early breakdown and destruction of the condenser.

Besides, there are further serious disadvantages in that a condenser of this type in which air spaces and voids cannot be avoided becomes very easily overheated and is liable to be affected by moisture and mechanical forces, such as pressure exerted upon the dielectric film. All these facts, as is understood, contribute to deleteriously affect the electrical properties of the condenser and increase the possibility of easy and early breakdown.

Accordingly, an object of this invention is to provide an improved condenser of the type hereinbefore described and a method of making the same which is free from the above mentioned disadvantage.

Another object of the invention is to make an electric condenser of the type mentioned in which excessive thermal potential differences are avoided, thus preventing substantial heat rise.

Still another object of the invention is to construct a condenser as mentioned which is substantially unaffected by the influence of moisture.

A further object of the invention consists in providing a condenser of the type referred to having a dielectric film of increased mechanical and electrical strength and which is substantially insensitive against mechanical forces such as pressure exerted upon the condenser body.

In accordance with these and further objects and aspects of the invention, the conducting layers and insulating dielectric films are produced by providing a metal base, preferably aluminum, such as aluminum foil or a base metal of different material provided with an aluminum coating, with an insulating oxide film. The provision of such an aluminum oxide film used in accordance with the invention may be carried out in accordance with the process as described by Shoji Setoh and Akira Miyata, in the abstracts from the University of Tokyo bulletin of the Institute of Physical and Chemical Research, volume 8, number 11, November 1929, page 105; volume 12, number 227, pages 268–274 of February 20, 1930.

This method is particularly advantageous for the purpose in accordance with the present invention in that it insures a film of substantially increased durability and of high mechanical as well as electrical strength by virtue of the electrolytic process of coating used by means of direct and superimposed alternative currents. Furthermore, this method has the advantage of easy adjustment or regulation of the thickness of the oxide film which, as is readily understood, is a decided advantage for the purpose in accordance with the invention in that the capacity dependent upon the thickness of the dielectric can be easily varied in this manner.

Thus, if aluminum foil has been coated with an oxide film according to this or any other process, after having been further treated if necessary by means of super-heated steam or in accordance with other processes for increasing the mechanical as well as electrical properties of the film, a further aluminum coating is then applied upon the oxide film, such as by means of mechanical spraying in accordance with the well-known metallizing process, or by means of an electrolytic process or the well-known plating process, in such a manner that an intimate contact between the oxide film and the metallic top layer absolutely free from included air spaces or voids is obtained and the whole condenser comprising the base metal, oxide film, and top layer metal forms a compact and integral unit.

In the appended drawing the new method of making an electric condenser has been illustrated from which further features and aspects of the invention will follow.

It should be understood, however, that the figures according to the drawing are intended to be illustrative only of the underlying principle of the invention which, as will be readily understood, is subject to many variations and modifications coming within its broader scope as expressed in the appended claims.

Figure 3:
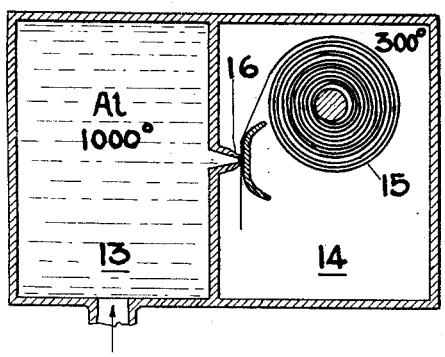

Figure 3 schematically illustrates one way of coating the oxide film with a metal layer.

Figure 4:
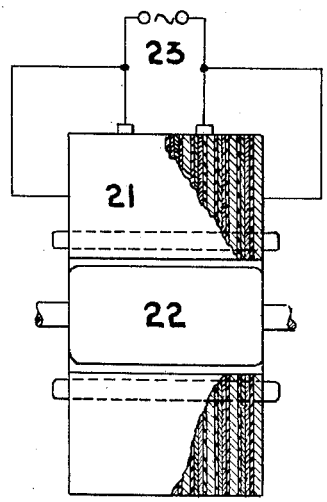

Figure 4 schematically illustrates the application of the invention to an electric motor such as for power factor correction.

Figure 1:
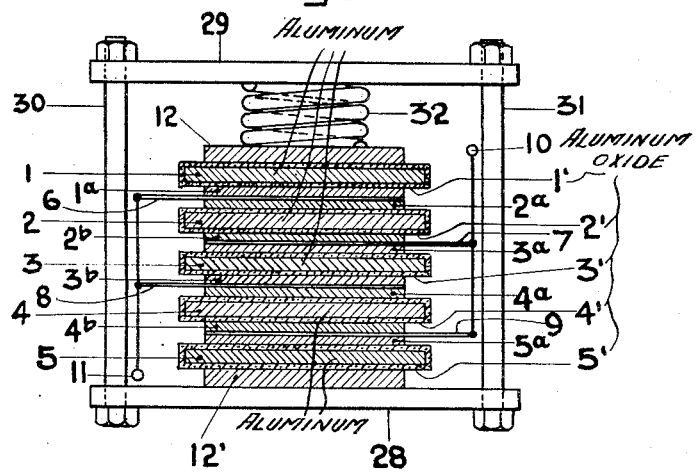
Figure 1 illustrates one form of making a condenser in accordance with the invention with the individual units being connected in parallel for increasing the final capacity.
Figure 2:
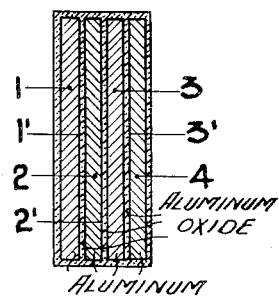
Figure 2 shows another method of making the same condenser with the individual units connected in series for high voltage operation.
Figures 5, 6:
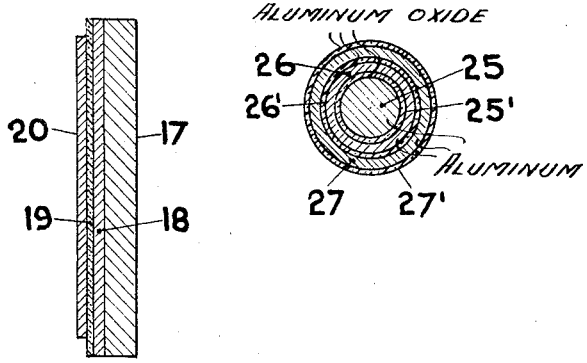

Figure 5 shows a single unit or condenser plate as used in accordance with Figures 1 and 2, illustrating an alternative method of practicing the invention.

Figure 6 illustrates the invention as applied for insulating an electric conductor.

Referring to Figure 1, the condenser is shown as consisting of five units comprised of metal plates, in the case shown solid aluminum plates 1, 2, 3, 4, and 5, respectively. These plates are each provided with aluminum oxide coatings 1', 2', 3', 4', and 5', respectively, such as by means of a process as above mentioned. The insulating coating according to Figures 2, 3, and 4 has been shown to surround the aluminum plates on all surfaces, which greatly simplifies the coating operation. Upon the oxide coatings there are applied metallic layers 1a, 2a, 2b, 3a, 3b, 4a, 4b and 5a, respectively, serving as the other armatures for the condenser units. These latter layers may be applied by any one of the above mentioned methods or preferably according to a mechanical method, as will be described in connection with Figure 3, the essential requirement being a close adherence to the oxide film to prevent free spaces or voids. The thus obtained individual condenser units each of which forms a compact integral body comprising three metal layers or strata with a thin oxide or dielectric film in-between, are stacked upon each other, as illustrated, with metallic sheets or connecting lugs 6, 7, 8, 9 placed between adjacent metal surfaces and protruding alternately at both ends as shown for parallel connection, as is well understood.

The condenser has been shown by way of example to be connected to terminals 10 and 11 of the direct current source. In order to secure efficient contact between the connecting lugs 6, 7, 8, and 9 and the condenser armatures, pressure end plates 12 and 12' are provided for clamping the condenser stack, such as by means of a mechanical clamping arrangement well known in the art, exerting a pressure upon the condenser stack. This has been shown in the drawing by the clamping members 28 and 29 held together by clamping screws 30 and 31 with a clamping spring 32 arranged between the member 29 and the condenser stack in accordance with well-known practice in the art.

When it is desired to have a condenser for operation under a high voltage strain and accordingly to connect a plurality of individual units in series, a construction may be easily carried out in accordance with the inventive method as illustrated in Figure 2, which shows a condenser forming a compact integral block needing no further clamping or pressure arrangement. In this figure, three individual units have been shown in a way similar to Figure 1. A first base metal sheet or plate 1 provided with an oxide coating 1', has applied to it the top metal layer 2, thus forming a complete unit. Instead of forming a plurality of individual units each comprising a pair of metal layers with an oxide layer integrally included therebetween in a way similar to Figure 1 and connecting all the units in series instead of in parallel as according to Figure 1, a simplified construction is obtained by oxidizing in turn the top layer 2 of the first unit, producing a second oxide film 2' thereon, coating the oxide film 2' with a metal layer 3 and continuing the process until a desired number of units forming an integral compact block is obtained, as is seen from Figure 2. The terminals are then connected to the first and to the last metal conductor 1 and 4, thus forming what is known as a floating condenser arrangement for high voltage operation.

Referring to Figure 3, this illustrates in a schematic manner a preferred method in accordance with the invention of applying the top metal layer upon the oxide film. Molten aluminum is kept under pressure in a first compartment 13 at a temperature above its melting point which is about 1000° centigrade. The liquid aluminum is then directed into a second compartment 14 of lower temperature, such as about 300° centigrade, and pressed or sprayed on to the oxidized aluminum sheets or foil 15, such as by means of a spraying device or nozzle 16. Thus, the aluminum applied upon the oxide film becomes immediately solid, the thickness of the aluminum layer depending upon the spraying pressure and on the speed with which the oxide coated foil or sheets are moved past the nozzle 16. In order to prevent the thus obtained aluminum layer from oxidizing, the chamber 14 may be filled with a suitable gas such as hydrogen preventing oxidation. It is well understood that any other well known process may be used to produce a metal layer intimately adhering to the oxide film, such as rolling on aluminum foil upon the oxidized foil under proper temperature, and the like.

Referring to Figure 4, this shows the invention as applied to an electric machine of known design such as an induction motor comprising a stator 21 and a rotating armature 22. The stator, as is well known, is usually of laminated construction comprising a plurality of iron sheets separated from each other by insulation such as by paper or a lacquer coating for the purpose of reducing losses by eddy currents. In accordance with a feature of the present invention, the stator sheets may be used for the further purpose of acting as a condenser of the type as according to the invention besides their function as magnetic cores for the stator flux by first being coated with aluminum, as will be described later, and then the aluminum provided with an oxide coating provided in turn with a metal coat in such a manner that the assembled stator sheets constitute an electric condenser in the same manner as the condenser described in accordance with Figures 1 and 5, respectively.

Such condenser may be directly connected in the motor circuit for various purposes, such as improving the starting torque or for power factor correction during running, as is well understood. In Figure 4 showing the sheets in greatly enlarged fashion for the sake of illustration the condenser has been indicated to be connected in parallel to the supply terminals 23 to produce wattless current for power factor improvement. In a similar way, the invention may be practiced in connection with electric transformers and the like, as may well be understood. In this case the stator 21 acting as an electrical condenser has to be carefully insulated against both the rotor 22 and ground, as is at once obvious.

According to a further feature of the invention, the metal sheets forming the armatures of the condenser may consist of a different metal coated with aluminum in which case a complete oxidation of the aluminum may be obtained, resulting in an increased durability and strength of the dielectric. This has been shown in more detail by Figure 5, illustrating a single condenser element in accordance with the invention as may be used for producing condensers, as described in Figures 1, 2, and 4. In this figure, 17 illustrates a base metal other than aluminum, such as for instance copper or iron coated with an aluminum layer 18 in accordance with well known processes in the art, such as by directly rolling aluminum on to the base metal foil under proper pressure and temperature. The aluminum coating 18 is then oxidized either partly or completely as may be desired, producing an oxide film 19 upon which the top metallic layer 20 is applied, as described hereinbefore.

In order to obtain a good condenser, the metallic foil and the oxide insulation applied thereon must be in intimate contact with no voids or air spaces left in between in order to prevent corona or glow discharge. In order to obtain this object, another favorable process has been found consisting of applying the top metallic layer by plating, especially by electro-plating or by producing alloy metals. Experiments have shown that the oxidation is more difficult when the surface to be coated with the thin oxide film consists of an alloy of the base metal and the aluminum and accordingly it is necessary to carry out the operation in such a manner that at first the alloy is developed and then a pure aluminum coating secured. A process of producing aluminum coatings consists in heating the aluminum in a vacuum above its melting point; that is, up to 1000° or 1200° centigrade, heating the base metal foils having a higher melting point (such as for instance, copper) than the aluminum whereby through the chemical affinity of the aluminum damps and the base metal, the surface of the latter is coated with an alloy of aluminum and the base metal. When this process is continued, the surface of the coating will finally become of pure aluminum which may eventually be refined by a subsequent rolling or drawing operation.

Instead of using the aforementioned method, the aluminum plating may be obtained through electrolysis using molten aluminum compounds, such as alkali metals as electrolyte, and an auxiliary anode of lead or other suitable metal.

Tests have also shown that the coating of the insulating dielectric film with a metal layer by means of an electro-plating process such as in a copper bath, does not offer great difficulties provided that provision is made to avoid oozing of the electrolyte through the oxide film which would result in a destruction and consequent short circuit of adjacent condenser plates.

Although in the drawing a condenser has been shown consisting of flat sheets or discs, it is well understood that the invention may be applied to any type of condenser construction, such as for instance to the rolled or wound type of condenser, in which case a plurality of properly coated sheets are wound into a roll, as will be readily understood by those skilled in the art.

Thus the invention as hereinbefore described may be applied to the construction of high voltage conductors or insulators in that a metallic conductor such as a conducting wire is at first coated with an oxide film and the oxide film in turn coated with a metallic layer carrying a further oxide film, and so on in accordance with the spirit of the invention as described with reference to Figure 2. This process is then repeated until a sufficient number of floating condenser-like units are obtained for withstanding high electric voltages in a manner similar to the well-known condenser bushings consisting of interleaved metallic foils and insulating paper sheets. In this manner electric conductors such as bushings may be easily made for operation under any desired high voltage.

This has been illustrated in Figure 6 which shows an electric conductor or wire 25 of aluminum or having an aluminum coating. The surface of the conductor 25 is provided with an oxide coating 25' as described in the invention and this oxide coating is in turn covered by a metallic coating 26 carrying a further oxide coating 26'. To this latter there is applied a second metallic coating 27 with an oxide surface 27'. As shown, this process may be repeated after a desired number of alternate metallic and insulating coatings are obtained for producing effective insulating for operation under a desired voltage.

I claim:

1. An electrical conductor having a core of conducting material, a layer of aluminum applied to said core, an insulating layer applied to said aluminum layer comprising a chemical compound of aluminum, a layer of aluminum applied to said insulating layer intimately united therewith, a similar layer of an aluminum compound applied to said last aluminum layer, and additional alternate insulating and conducting layers closely and intimately united with each other to form a compact integral unit of floating condenser elements covering said core.

2. An electrical conductor comprising a metallic core, a layer of aluminum covering said core, an insulating layer consisting of aluminum oxide applied thereon, a further aluminum layer applied to said oxide layer closely and intimately united therewith, a further oxide layer applied to said last aluminum layer and additional alternate aluminum and aluminum oxide layers to form an integral compact unit having a desired number of floating condenser elements covering said core.

3. An electric conductor comprising an aluminum core, a layer of aluminum oxide applied to said core, a layer of metallic aluminum applied to said oxide layer closely and intimately united therewith, a further aluminum oxide coating applied to said metallic layer, and additional alternate aluminum and aluminum oxide layers constituting a desired number of floating condenser elements covering said core and forming a compact integral unit therewith.

4. An electric conductor comprising a metallic wire, a first insulating layer applied to said wire constituted by a chemical compound of said wire, a metallic layer applied to said insulating layer intimately united therewith and isolated from said conductor, a second similar insulating layer applied to said metallic layer and isolated from said conductor, a second metallic layer applied to said second insulating layer intimately united therewith, and additional alternate metallic and insulating layers to constitute a plurality of floating condenser elements covering said metallic wire and forming a compact integral unit therewith.

5. An electric conductor comprising an aluminum wire, an aluminum oxide film thereon, a layer of aluminum applied to said oxide layer intimately united therewith and isolated from said wire, a second aluminum oxide layer applied to said aluminum layer, and additional alternate aluminum and aluminum oxide layers applied to said wire to constitute a desired number of floating condenser elements covering said wire and forming a compact integral unit therewith.

6. An electric conductor comprising a metallic base, an insulating layer intimately adhering to said base, said insulating layer consisting of a chemical compound of the base metal, a layer of base metal applied to said insulating layer and closely and intimately united therewith, a further insulating layer similar to said first insulating layer intimately adhering to said last mentioned metal layer, and additional alternate layers of the base metal and layers of compound thereof to form a compact unit comprising a desired number of floating condenser elements covering said base.

ALEXANDER FEKETE.